United States Patent [19]
Justason

[11] 3,711,952
[45] Jan. 23, 1973

[54] BELT MEASURING APPARATUS

[75] Inventor: Alastair Justason, Toronto, Ontario, Canada

[73] Assignee: The B. F. Goodrich Company, New York, N.Y.

[22] Filed: Aug. 18, 1971

[21] Appl. No.: 172,626

[52] U.S. Cl. ................................33/125 R, 33/143 J
[51] Int. Cl. ................................................G01b 5/00
[58] Field of Search ....33/125 R, 143 R, 143 M, 159, 33/160, 27 C, 165, 143 J, 143 K

[56] References Cited

UNITED STATES PATENTS

| | | | |
|---|---|---|---|
| 2,241,979 | 5/1941 | Case | 33/125 R |
| 1,262,678 | 4/1918 | LaPoint | 33/143 M |
| 1,816,695 | 7/1931 | Pope | 33/143 R |
| 2,044,983 | 6/1936 | Hedgpeth | 33/125 R |

FOREIGN PATENTS OR APPLICATIONS

| | | | |
|---|---|---|---|
| 251,156 | 10/1947 | Switzerland | 33/143 J |

*Primary Examiner*—Harry N. Haroian
*Attorney*—Roger A. Johnston

[57] ABSTRACT

A device for measuring the circumference and section width of V-belts while the belt is maintained under tension. The belt is tensioned over two half pulleys, one of which is mounted on a slide with a releasable locking wedge maintaining the latter a fixed distance along the slide to hold the belt under tension. A belt length indicating scale is provided on the slide and one of the half pulleys has a section-width indicating scale thereon which cooperates with the length indicating scale to provide a direct reading of both length and width of the belt.

5 Claims, 3 Drawing Figures

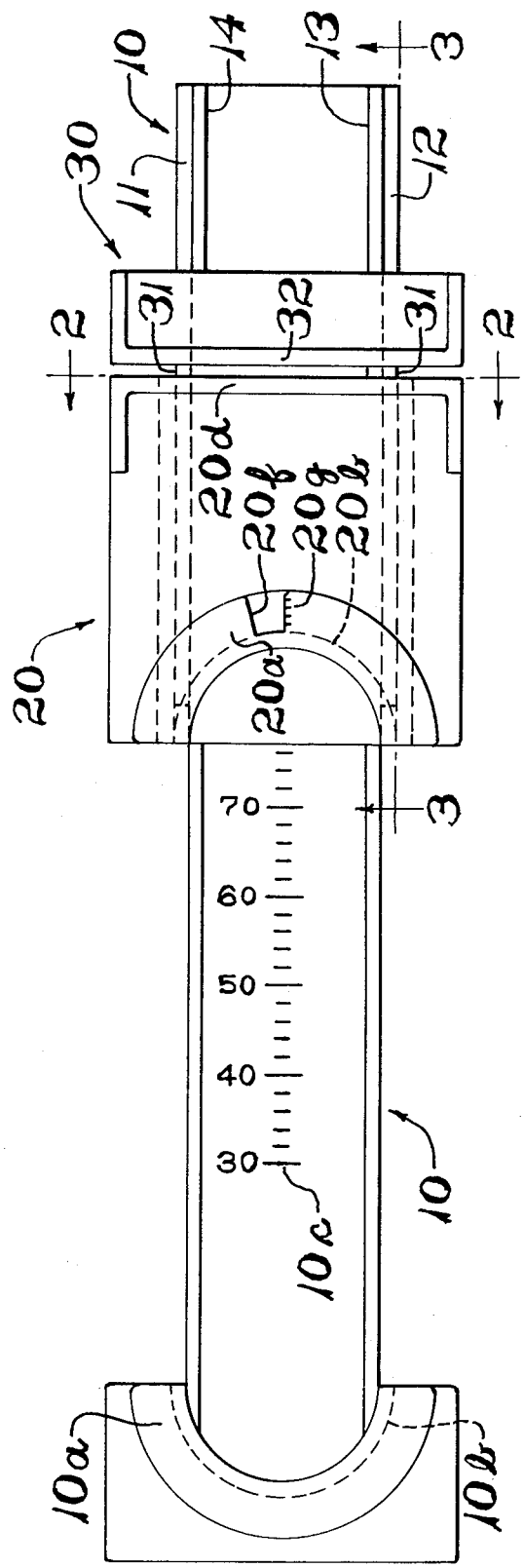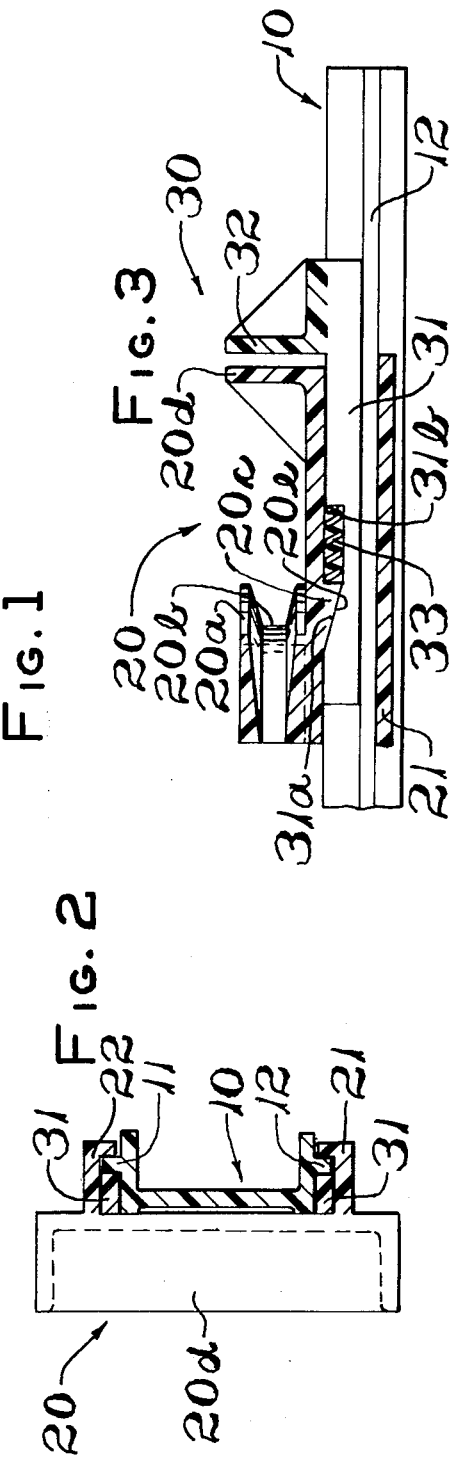

3,711,952

BELT MEASURING APPARATUS

BACKGROUND OF THE INVENTION

Where it is commercially important to measure the length and sectional width of V-belts of unknown size, it has often been quite difficult to determine accurately these dimensions where several sizes of belts have been commingled. This is particularly true where the sizes differ from each other by only a small amount. It is desirable to measure a V-belt under tension in order to get an accurate reading of the belt circumference. However, this has not been convenient for persons such as warehouse and stock room personnel having need to measure quantities and sort quantities of belts, since the previously available devices for measuring the belts and maintaining tension were too awkward to be readily carried so as to permit utilization of such a device at many different locations. It has thus been desirable to provide a lightweight portable device easily carried by one person and one which is simple in operation so as to enable the rapid measuring of belts under tension in a relatively short duration of time.

SUMMARY OF THE INVENTION

The present invention provides a solution to the above-described problem by a simple lightweight portable plastic device which is easily carried by one person. A V-belt may be quickly and easily mounted on the device, tension applied and the device locked to maintain the tension for the operator while the operator reads from scales on the device the desired measurements of the belt. The device features two half-pulleys mounted on a slide for receiving the belt thereover, with one half-pulley fixed and the one free to move on the slide. A locking mechanism in the form of a wedge is provided on the slide to lock the movable half-pulley in any desired position. The locking mechanism is quickly releasable by finger pressure to permit release of the tension and easy removal of one belt and rapid mounting of another.

BRIEF DESCRIPTION OF THE DRAWINGS

FIG. 1 is a plan view of the preferred embodiment of the present invention with the movable half-pulley spaced from the fixed half-pulley;

FIG. 2 is a section view taken along section indicating line 2—2 of FIG. 1;

FIG. 3 is a fragmentary section view taken along section indicating line 3—3 of FIG. 1.

DETAILED DESCRIPTION

Referring now to FIG. 1, the preferred form of the invention is illustrated wherein a guide member 10 is shown in the form of an extrusion of rigid plastic or other suitable material having tracks 11 and 12 formed in parallel arrangement on opposite sides thereof. A pair of longitudinally disposed spaced parallel ways 13 and 14 are provided on one face of the guide member for receiving sliding members thereon. One end of the guide member 10 has a portion, fixedly attached thereto, or formed integrally thereon, in the shape of a half-pulley 10a having a circumferential groove 10b formed therein. The groove 10b is arranged preferably so that the plane of the circumferential center-line of the groove is parallel to the plane formed by the upper surfaces of the ways 13 and 14.

A slide member 20, formed of rigid plastic or other suitable material, is mounted on the ways 13 and 14 of the guide member and, referring to FIG. 2, is shown having portions 21,22 in the form of guides each of which mate respectively with one of the tracks 11,12 provided on the guide member 10. This enables the slide 20 to be moved longitudinally along the guide member 10 while restrained from inadvertent removal therefrom. The guides 21 and 22 are preferably L-shaped in transverse section so that the slide member must be assembled over the end of the guide member 10 and, once assembled, is restrained from transverse removal from the guide member 10, but is otherwise free to slide therealong.

The slide 20 has a half-pulley 20a formed thereon which is symmetrically opposite the half-pulley 10a formed on the guide member. The half-pulley 20a also has a circumferential groove 20b formed therein which groove has a V-shape in cross section and which is adapted to receive a V-belt therein. The groove 20b is arranged so that the plane of the circumferential center-line of the groove is parallel to the upper surface of the ways 13,14 of the guide member and in the same plane as the circumferential center-line of the groove 10b. The half-pulleys 20a and 10a are disposed such that when a belt is received in their respective grooves 20b and 10b, the slide member 20 may be moved along the guide member 10 so as to draw the belt taut thereover. The slide member 20 has a gripping portion 20d in the form of a flange extending generally at right angles to the surface thereof to permit manual gripping of the slide for moving it along the guide member.

A locking member 30, preferably also of rigid plastic material, is provided, the member 30 having a pair of spaced parallel rails 31 extending therefrom and a gripping portion 32 transversely connecting the rails and extending generally at right angles from the plane of the two rails. In plan view the locking member 30 forms a generally U-shaped configuration; however, in FIG. 1, the rails 31 are substantially hidden by the slide 20, and therefore are shown by dashed line where they pass under the slide. Each of the rails 31 has a wedge portion 31a formed adjacent the end thereof, the wedge having a surface inclined to the longitudinal direction of the rail 31 with the thickness of the tapered portion thus formed decreasing in a direction away from the end of the rail. The rails 31 of the locking member are spaced transversely so as to interfit the tracks 11 and 12 on the guide member.

Referring now to FIG. 2, the rails 31 are shown as having a generally rectangular cross section with transverse width such that the rails are disposed in a slip fitting manner respectively between the guide portions 21,22 of the slide member and the tracks 11 and 12.

Referring now to FIG. 3, a pair of transversely spaced tapered lugs 20c are provided on the slide member 20 with the lugs 20c transversely spaced the same distance so as to engage each, respectively, one of the inclined surfaces 31a on the rails 31 on the locking member, the lugs 20c having an inclined surface 20e inclined an amount equal in degree but opposite in direction as the corresponding inclined surface provided on each of the rails 31. The inclined surfaces 31a on the rails 31 and inclined surfaces 20e on the lugs 20c of the slide member are disposed in longitudinal overlapping relationship so that as the slide member 20 is moved in a longitudinal direction from the slide member 30, the inclined surfaces on each of the respective parts make contact and provide a wedging action therebetween so as to lock both the rails 31 on the locking member and the portions 21 and 22 of the slide member against the guides 11 and 12 of the guide member 10, thus preventing further longitudinal movement of either the slide 20 or the locking member 30 with respect to the guide member 10. A notch or cutout 31b is provided in each of the rails 31 which cutout receives a compression spring 33 therein, the spring being installed so as to urge the locking member 30 and the slide member 20 in opposite directions thereby normally maintaining the respective adjacent inclined surfaces in contact thus locking the parts.

In operation, the operator places a belt to be measured over the two half-pulleys 10a and 20a, grasps the gripping portion 20d of the slide member 20 and the gripping portion 32 of the locking member 30, holding the two portions together against the force of springs 33, and pulls the slide member and locking member along the slide 10 so as to tension the belt over the half-pulleys. Upon reaching the position on the slide in which the belt is under sufficient tension to resist further movement of the slide member, the operator need only release pressure on the gripping portions 20d and 32 with the result that the tension on the belt will be maintained by virtu of the springs 33 urging the locking member in a direction away from the slide member so as to wedge the inclined surfaces of the arms 31 against the inclined surfaces of the lug 20c thereby locking the slide member on the guide member. To release tension on the belt the operator grips the portion 20d of the slide member and the portion 32 of the locking member exerting pressure thereon to bring the two portions together which motion releases the locking action of the inclined surfaces on the lugs 20c and the arms 31. The portions 20d and 32 are maintained together and moved in a direction towards the half-pulley 10a so as to permit removal of the belt from the half-pulleys.

In the present practice of the invention, a scale 10c is marked along the flat surface of the elongated portion of guide member 10 which scale is located such that the diametral surfaces of the half-pulleys 20a are opposite the markings on scale which is so calibrated as to indicate directly for any position of the half-pulley 20a along the slide the corresponding length of the belt. A cut-out or notch 20f is formed into the face of the half-pulley 20a to permit viewing the radial location of the outer circumference of the belt in the groove 20b. Markings in the form of a radial scale 20g, calibrated to indicate directly belt section width, are provided adjacent the notch 20f such that the operator, by observing the position of the outer circumference of the belt on the radial scale 20f, may read directly from the scale 20f the corresponding belt cross section size or width. The groove 20b, being a standard 60° included angle V-belt groove permits a belt of any given section width to attain only a fixed radial depth in the groove 20b, and thus it is possible to predetermine the radial depth in the groove of known belt section widths and correspondingly arrange the markings on the scale 20g to indicate, from the radial position in the groove of the outer surface of the belt, the belt cross section width or size.

The present invention thus provides a lightweight portable plastic measuring device which enables a V-belt to be quickly measured for circumference and section size while the belt is under tension, the tension then quickly released and the device positioned for receiving another belt. The locking feature of the device enables an operator to tension the belt and read the belt size without the necessity of manually maintaining tension on the belt while performing the measuring operations.

Persons having ordinary skill in the art will be able to make modifications and adaptations to the invention within the spirit and scope of the invention which is limited only by the following claims.

I claim:

1. A device for measuring endless V-belts under tension comprising:
   a. an elongated guide member having a portion adapted to contact the inner periphery of a belt to be measured;
   b. slide means adapted to contact the inner periphery of said belt, said means being movably mounted on said guide member for tensioning the belt and having a locking portion formed thereon which portion is capable of being urged frictionally against said guide member such that movement of said slide means with respect to said guide member is prevented;
   c. locking means movably mounted on said guide member, said means releasably engaging said slide means for preventing movement of the latter on said guide member; said locking means having a portion thereof which frictionally contacts the locking portion of said slide means urging same into releasable contact with portions of said guide member when said locking means is moved along said guide member away from said slide means.

2. The device defined in claim 1, wherein
   a. said locking portion of said slide means has an inclined surface thereon;
   b. said locking means has an inclined surface corresponding to the inclined surface on said slide means such that upon movement of said locking means away from said slide means and the said inclined surface of said locking means contacts the said inclined surface of said slide means and wedges the said locking portion of said slide means against said guide member thereby preventing movement of said slide means thereon.

3. A device for measuring endless V-belts under tension comprising:
   a. an elongated guide member having a semi-circular portion formed at one end thereof grooved to receive a portion of the inner periphery of a belt, said member having a pair of spaced parallel ways formed along the edges thereof, the said ways adapted to receive a slide thereover;
   b. a slide member having a semicircular portion grooved to receive a portion of the inner periphery of a belt, and having a pair of rails provided thereon extending in spaced parallel relationship from said semicircular portion which rails are each slidably received in respectively one of the said ways and each of said rails has a cam portion formed adjacent the free end thereof;

c. a locking member having a generally U-shaped configuration with the leg portions of the said U-shape each respectively slidably received in one of said ways of said guide and each of said leg portions has a locking cam portion formed adjacent the end thereof complementary to the respective cam portion on said guide member which locking cam is adapted to wedge thereagainst;

d. spring means provided in each of said ways for urging each of said locking cam portions on said slide member into contact with the corresponding adjacent cam portion on said locking member and preventing movement of said slide member and said locking member with respect to said guide member.

4. The device defined in claim 3, wherein a measuring scale provided on said guide member which scale indicates the position of the semicircular portion of said slide means therealong, said scale being calibrated to indicate directly the length of a belt received over the semicircular portions of said guide member and said slide member.

5. The device defined in claim 3, wherein said grooved semicircular portion of said slide member has a radial notch formed in the edge of said groove such that the side of a belt received therein is exposed and said notch has a scale provided along one radial edge thereof which scale indicates the radial position of the outer periphery of a belt received in said groove, said scale being calibrated to indicate directly the cross-sectional width of such a belt.

* * * * *